TRANSISTORIZED EXCLUSIVE OR LOGIC CIRCUIT

Filed March 4, 1964

INVENTORS.
GLENN R. HEARN
and EDWARD C. NELLUM
BY Spencer E. Olson
ATTORNEY.

United States Patent Office 3,309,531 Patented Mar. 14, 1967

3,309,531 TRANSISTORIZED EXCLUSIVE OR LOGIC CIRCUIT

Glenn R. Hearn, Burlington, Mass., and Edward C. Nellum, Rochester, N.Y., assignors to Sylvania Electric Products Inc., a corporation of Delaware Filed Mar. 4, 1964, Ser. No. 349,427
3 Claims. (Cl. 307—88.5)

This invention relates generally to electronic logic circuitry and more particularly to improved circuitry for performing the logical EXCLUSIVE OR, NOT EXCLUSIVE OR or similar functions.

The EXCLUSIVE OR and NOT EXCLUSIVE OR functions are frequently used in digital computing, data handling and communications equipment, typical application being parity generation, parity checking and arithmetic addition. Using standard logic notations, the EXCLUSIVE OR function of two logical inputs A and B, defined as $\overline{A}B+A\overline{B}$, is a logical "1" if A and B are different, and is a logical "0" if A and B are the same. The NOT EXCLUSIVE OR function of two logical inputs A and B, defined as $AB+\overline{A}\overline{B}$, is a logical "0" if A and B are different, and is a logical "1" if A and B are the same. These functions may be represented by the following truth table.

| A | B | EXCLUSIVE OR | NOT EXCLUSIVE OR |
|---|---|---|---|
| | | $\overline{A}B+A\overline{B}$ | $AB+\overline{A}\overline{B}$ |
| 1 | 1 | 0 | 1 |
| 1 | 0 | 1 | 0 |
| 0 | 1 | 1 | 0 |
| 0 | 0 | 0 | 1 |

When electronic circuits are implemented to perform these functions, it is customary to define one voltage level as being equivalent to a logical "1," and some different voltage level is defined as equivalent to a logical "0." It will become evident from the following discussion, depending upon which voltage is defined as a logical "1" equivalent and which is a logical "0" equivalent, that the same circuit can be considered to generate either the EXCLUSIVE OR or the NOT EXCLUSIVE OR function. For convenience, unless otherwise noted the following description refers to an EXCLUSIVE OR circuit, with the understanding that it is equally applicable to a NOT EXCLUSIVE OR circuit.

Circuits for the generation of the EXCLUSIVE OR function are well known to the art. Typical of such circuits is the one shown in FIG. 35 at page 1250 of the Proceedings of the IRE, Transistor Issue, of June 1958, and described in the accompanying article by R. A. Henle and J. J. Walsh entitled, "The Application of Transistors to Computers." The circuit therein described provides an output of approximately zero volts only if the two input signals are different, but the approximately zero volts output is more negative than the approximately zero volts input by the amount of the transistor collector-to-emitter saturation voltage drop, and since the current gain of the circuit is something less than unity, an additional amplifier is required for restandardizing the voltage levels and producing the necessary current gain to allow the circuit to be used to perform general purpose logic, such as a cascaded chain of EXCLUSIVE OR circuits. An example of such a modification is the circuit shown and described on pages 7–28 and 7–29 of the Selected Semi-Conductor Circuits Handbooks edited by Seymour Schwartz and published by John Wiley & Sons, Inc. However, this circuit, since it requires two additional transistors and the necessary associated circuit components, is both uneconomical and space consuming.

Therefore, it is a principal object of this invention to provide a circuit of economical design capable of performing the EXCLUSIVE OR (NOT EXCLUSIVE OR) function.

A further object of the invention is to provide a circuit of this type in which the approximately zero volts output is at a standard level.

Still another object of the invention is to provide a logic circuit of this type having sufficient current gain to be capable of driving a number of subsequent stages.

These and other related objects are accomplished in one illustrative embodiment of the invention by a combination of a modified OR gate operative in conjunction with an inhibit gate in a manner such that the inhibit gate output is able to override turn-on signals applied to the modified OR gate configuration when the latter gate would otherwise be activated.

A better understanding of the construction and operation of the invention will become apparent from the following detailed description taken in conjunction with the accompanying drawings, in which.

Figure 1:
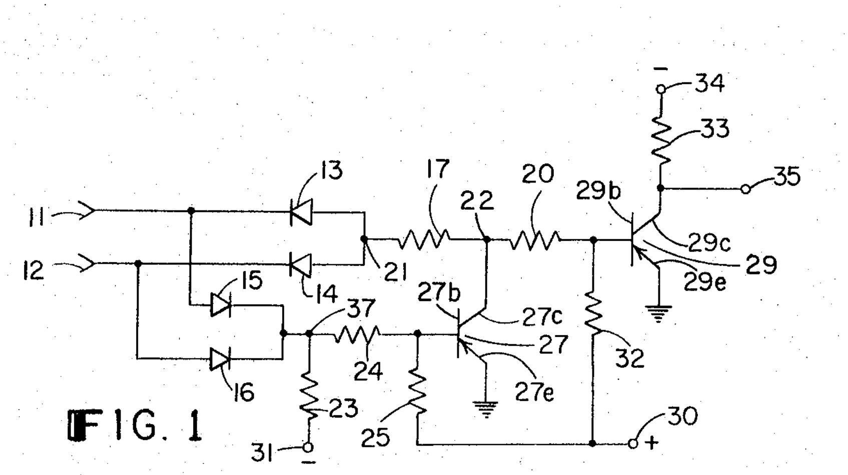
FIG. 1 is a schematic circuit diagram of an EXCLUSIVE OR (NOT EXCLUSIVE OR) circuit embodying the invention.

Referring to FIG. 1, the circuit of the invention includes a pair of input terminals 11 and 12 respectively connected via diodes 13 and 14 to a junction 21, which is, in turn, connected via resistor 17 to junction 22. Junction 22 is connected via resistor 20 to the base electrode **29*b* of a first transistor 29. The input terminals 11 and 12 are additionally connected via diodes 15 and 16 to a junction 37, which is, in turn, connected through resistor 24 to the base electrode 27*b* of a second transistor 27. Junction 37 is also connected via resistor 23 to a first source of negative potential represented by terminal 31. The base electrode 29*b* of transistor 29 and the base electrode 27*b* of transistor 27 are connected via resistors 32 and 25, respectively, to a source of positive potential represented by terminal 30. The transistors 27 and 29 are connected in the common emitter configuration with their respective emitter electrodes 27*e* and 29*e* connected to ground potential. The collector electrode 27*c* of transistor 27 is directly connected to the junction 22 of resistors 17 and 20. The collector 29*c* of transistor 29 is connected through resistor 33 to a second source of negative potential represented by terminal 34, and to an output terminal 35. In operation, the input voltages to terminals 11 and 12 are one of two possible voltage levels; for example, ground potential and a potential negative with respect to ground. The resultant output voltage at terminal 35** is either ground or some negative potential, as determined by the response of the circuit to the input signal voltages.

A circuit which has been successfully operated had the following component values and commercial identities:

| | |
|---|---|
| Resistors 17 and 33 ohms | 2.2K |
| Resistor 20 do | 1K |
| Resistor 23 do | 12K |
| Resistor 24 do | 4.7K |
| Resistors 25 and 32 do | 27K |
| Diodes 13, 14, 15 and 16 | 1N276 |
| Transistors 27 and 29 | 2N964 |
| Potential at terminals 31 and 34 v | −12 |
| Potential at terminal 30 v | +12 |

Figures 2, 3:
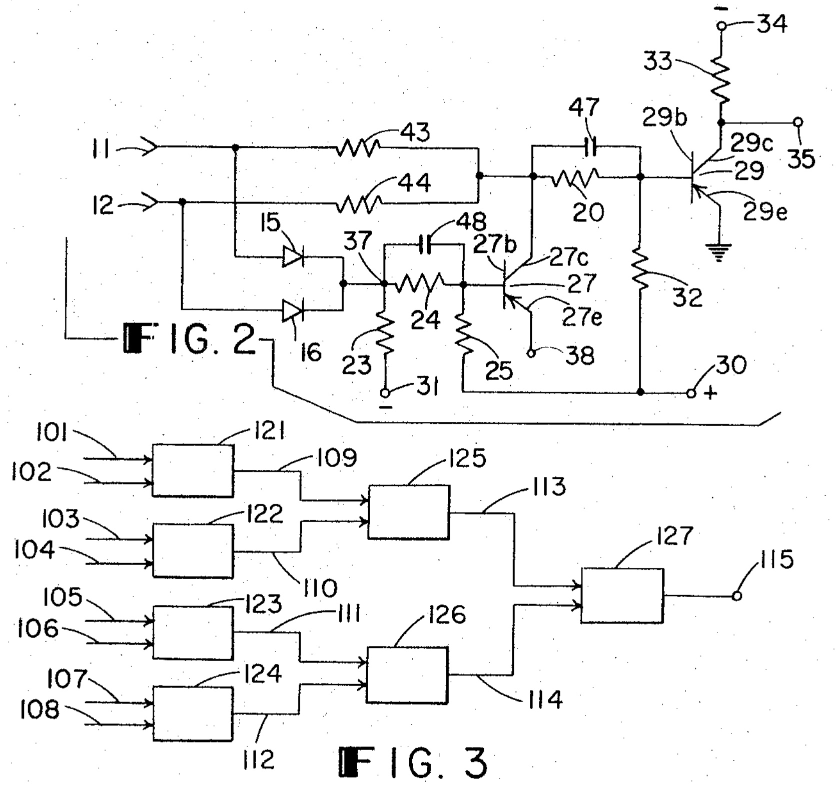
FIG. 2 is a schematic representation of an alternative form of the circuit of FIG. 1; and, FIG. 3 is a block diagram representing the cascading of a multiplicity of the EXCLUSIVE OR circuits of FIG. 1.

This circuit was designed for operation in a system wherein a number of EXCLUSIVE OR circuits are connected in cascade as shown in FIG. 3. In such a system each of the EXCLUSIVE OR circuits 121 through 127 are of the same design as the circuit of FIG. 1.

The input signal voltages to terminals 11 and 12 are either a nominal zero volts or −8 volts, with the nominal zero level representing a logical "1," and the −8 volts level representing a logical "0." The circuit responds to these input signal levels to produce an output signal voltage of either a nominal zero volts or −8 volts.

The operation of the circuit of FIG. 1 will be better understood from the following detailed description, taken in conjunction with the following table of the potentials found at various points in the circuit. It will be appreciated that there are four possible input signal voltage conditions corresponding to the four possible logical conditions in the aforementioned logical table of an EXCLUSIVE OR function.

| Inputs | | Circuit Reference Point | | | | | Output |
|---|---|---|---|---|---|---|---|
| 11 | 12 | 21 | 37 | 22 | 27b | 29b | 35 |
| 0v | 0v | 0v | 0v | +0.9v | +1.8v | +1.3v | −8v |
| 0v | −8v | −8v | 0v | −2.7v | +1.8v | −0.5v | 0v |
| −8v | 0v | −8v | 0v | −2.7v | +1.8v | −0.5v | 0v |
| −8v | −8v | −8v | −8v | 0.5v | −0.5v | +0.5v | −8v |

As can be seen from this table, because of the action of diodes 13 and 14, point 21 is held at the more negative of the two input voltage levels, whereas diodes 15 and 16 maintains point 37 at the more positive of the input voltage levels.

For the first of the above input conditions, the signals at terminals 11 and 12 are both zero volts thereby maintaining points 21 and 37 at zero volts. The resistive divider consisting of resistors 24 and 25 connected between point 37 and the +12 volts source of potential 30, yields a potential of +1.8 volts at the base 27*b* of transistor 27, so that the transistor with its base to emitter junction back-biased is non-conducting. In a similar manner the resistive divider network consisting of resistors 17, 20 and 32 connected between point 21 and the aforementioned +12 volts source of potential 30, maintains the base 29*b* of transistor 29 at a potential of +1.3 volts, such that its base-to-emitter junction is also back-biased, thereby maintaining transistor 29 cut-off; consequently, the output 35 is at a negative voltage level of −8 volts. This is equivalent to the condition where the two inputs are logical "1's" and the resultant output is a logical "0."

A second possible condition is that input 11 is at zero volts and input 12 is at −8 volts (or in the alternative input 11 is at −8 volts and input 12 is at zero volts). In both situations points 21 goes to −8 volts and point 37 to zero volts. Since point 37 is at zero volts, in the same manner as described above, the base-to-emitter junction of transistor 27 is back-biased at +1.8 volts with the result that this transistor is non-conducting. With point 21 at −8 volts, the base-to-emitter junction of transistor 29 becomes forward-biased, resulting in transistor 29 being driven into saturation so that the collector electrode 29*c* of transistor 29 rises to almost zero volts. As a result the circuit output 35 is a nominal zero volts. It is seen that this condition is analogous to having the two logical inputs in differing states with the result that the output is a logical "1."

The remaining possible condition is that inputs 11 and 12 are both at −8 volts resulting in points 21 and 37 also being at −8 volts. The −8 volts at this point 21 provides a source of negative potential via resistor 17 to the collector electrode 27*c* of transistor 27. As a result of the −8 volts at point 37, the base-to-emitter junction of transistor 27 is forward-biased, thereby causing transistor 27 to be driven into saturation. Therefore, point 22 is at a nominal zero volts and because of the resistive network consisting of resistors 20 and 32 between point 22 and the +12 volts source of potential 30, a positive potential of +0.5 volt is evidenced at the base electrode 29*b* of transistor 29. As a result, transistor 29 has its base-to-emitter junction backbiased and the transistor is cut off thereby causing the output 35 to be at −8 volts. This corresponds to the condition when both inputs are at a logical "0" level and the output is a logical "0."

As can be seen from the above description that part of the circuit consisting of diodes 15 and 16, resistors 23, 24, and 25, capacitor 26, and transistor 27 acts as an inhibit gate with the remainder of the circuit operating as a modified "OR" gate. This inhibit gate is functionally operative only when the two input signals are at the negative voltage level.

It will be obvious to ones skilled in the art that variations to the above-described preferred embodiment may be made without departing from the spirit of the invention. Examples of such modifications are shown in the circuit of FIG. 2, wherein the diodes 13 and 14 of the circuit of FIG. 1 are replaced by resistors 43 and 44, respectively. Also, capacitors 48 and 47 may be connected in parallel with resistors 24 and 20, respectively, to provide increased circuit speed. Additionally, in the circuit of FIG. 1, if the collector-to-emitter voltage drop of transistor 27 is less than the base-to-emitter voltage conduction threshold of transistor 29, resistor 20 can be replaced by a short circuit. To insure such a condition, the emitter 27*e* of transistor 27 may be connected to a source of slightly positive potential, represented by terminal 38. It is further obvious that the PNP transistors can be replaced by NPN transistors if the polarity of the diodes and reference potentials are reversed. It is, therefore, intended that the invention not be limited to the specifics of the preceding description of one preferred embodiment, but rather to embrace the full scope of the following claims.

What is claimed is:

1. A logic circuit comprising: first and second transistors each having base, emitter and collector electrodes; first and second input terminals to which respective sources of input voltage levels are adapted to be applied; first and second diodes; a first resistor; said first diode being connected between said first input terminal and said first resistor; said second diode being connected between said second input terminal and said first resistor; a second resistor; means connecting said first and second resistors in series to the base electrode of said first transistor; third and fourth diodes; said third and fourth diodes being respectively connected between said first and second input terminals and one terminal of a third resistor, means connecting the other terminal of said third resistor to the base electrode of said second transistor; a first source of potential connected to the junction of said third and fourth diodes and said third resistor; a second source of potential opposite in polarity to said first source of potential connected to the base of said second transistor; further means connecting the base electrode of said first transistor to said second source of potential; a point of reference potential; means directly connecting the emitter electrodes of said first and second transistors to said point of reference potential; means directly connecting the collector electrode of said second transistor to the junction between said first and second resistors; a third source of potential connected to the collector electrode of said first transistor; and an output terminal connected to the collector electrode of said first transistor.

2. A circuit in accordance with claim 1 wherein said first and second diodes are replaced by fourth and fifth resistors, and said first resistor is replaced by a short circuit.

3. A circuit in accordance with claim 1 wherein said third and fourth diodes are replaced by fourth and fifth resistors, respectively.

References Cited by the Examiner

UNITED STATES PATENTS

| | | | |
|---|---|---|---|
| 2,982,868 | 5/1961 | Emile | 307—88.5 |
| 3,023,965 | 3/1962 | Campbell | 307—88.5 |
| 3,196,261 | 7/1965 | Schaefer | 307—88.5 |
| 3,229,117 | 1/1966 | Chilton | 307—88.5 |

ARTHUR GAUSS, *Primary Examiner.*

B. P. DAVIS, *Assistant Examiner.*